Figure 1:
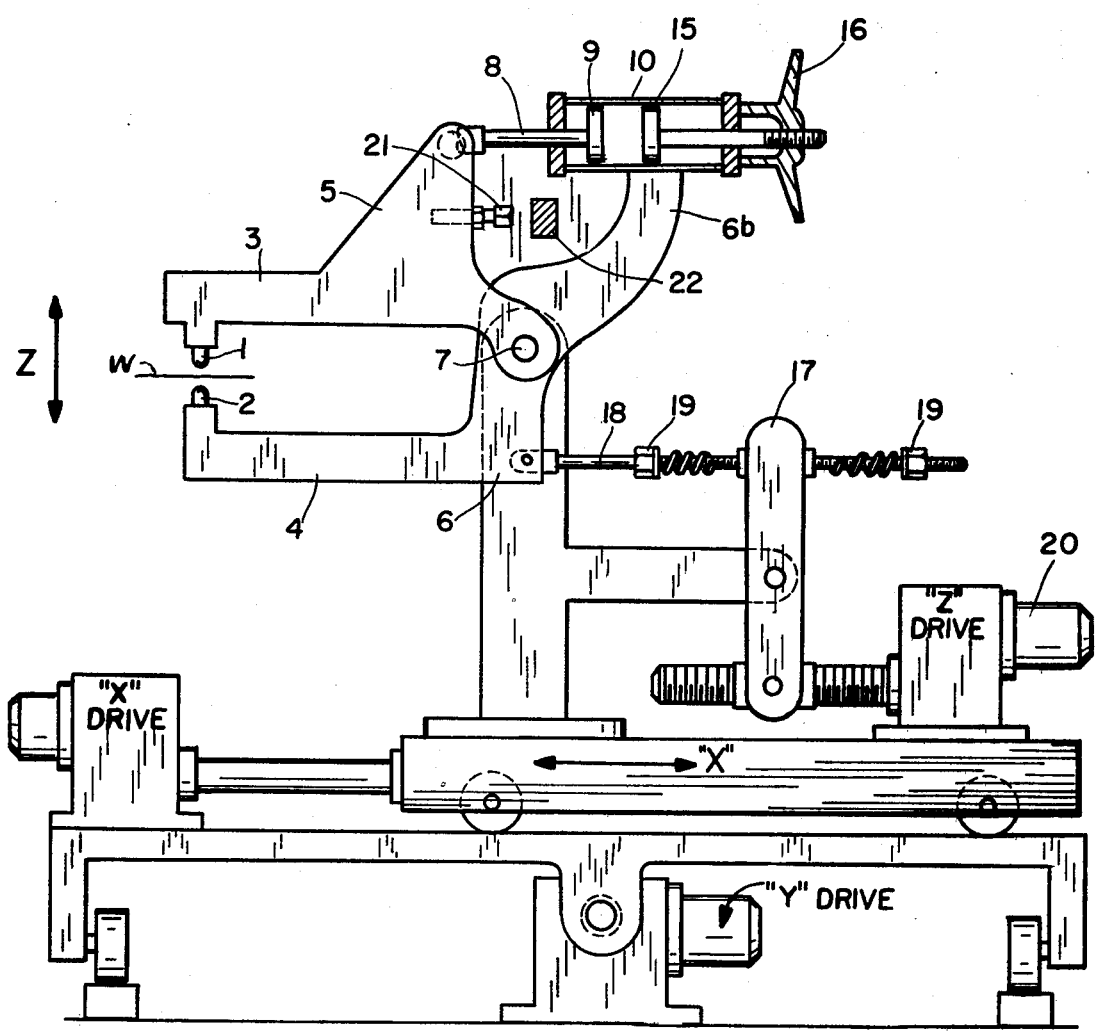

United States Patent [19]

Challenger

[11] Patent Number: 4,458,131

[45] Date of Patent: Jul. 3, 1984

[54] ROBOT WELDER

[75] Inventor: Richard Challenger, Cortland, Ohio

[73] Assignee: The Taylor-Winfield Corporation, Warren, Ohio

[21] Appl. No.: 390,240

[22] Filed: Jun. 21, 1982

[51] Int. Cl.³ .............................................. B23K 11/30
[52] U.S. Cl. ........................................ 219/89; 219/90
[58] Field of Search ............ 219/86.25, 89, 90, 124.1, 219/124.22, 124.4, 125.1, 125.11

[56] References Cited

U.S. PATENT DOCUMENTS 2,487,262  11/1949  Mueller ................................ 219/89
3,665,148   5/1972  Yasenchak et al. ............... 219/124.4

Primary Examiner—C. C. Shaw
Attorney, Agent, or Firm—William J. Ruano

[57] ABSTRACT

A Robot type resistance welder of very large capacity that enables the electrodes of the welder to be readily adjustable in the welding and retracting strokes and automatically controlled so as to retract when encountering an obstacle - also whereby the degree of retraction of electrodes may be selectively controlled and whereby the vertical elevation of the work plane may be varied during welding in accordance with the contour of the work, such as a curved panel. The respective electrodes of the spot welders have supporting arms which are pivotally interconnected together with an operating air cylinder. An adjustable stop is provided in the air cylinder to adjust the extent of retraction. The entire assembly including the pivotal supporting arms and inter-connected cylinder are provided with an adjustable stop for limiting the pivotal movement of the assembly. Such pivotal movement is cushioned by springs. By preprogramming spot welding, automatic welding in a very short time can be accomplished on a wide variety of panel shaped objects while speedily producing welds of excellent quality.

2 Claims, 1 Drawing Figure

ROBOT WELDER

This invention relates to a "robot" type of spot welder of high capacity.

Resistance spot welding "robots" currently in use have limited capacities in throat depth, weld force and weld current due to limited weight that can be supported at the end of the "robot" arm.

An object of the present invention is to overcome the above named disadvantages insofar as panel welding is concerned, and to incorporate "robot" performance in a spot welder of such construction that it can be built in very large sizes and welding capacities, far exceeding that of any "robot" welder hertofore devised.

Another object of the invention is to provide a novel resistance welder, particularly suitable for "robot" operation and embodying electrodes having variable working strokes, retraction strokes and as well as variable electrode elevation adjustment, with the capability of making both the working strokes and retracting strokes of one electrode different from that of the other to allow clearing of obstacles while in the course of preprogrammed spot welding.

Other objects and advantage of the invention will become more apparent from a study of the following description, taken with accompanying drawing wherein:

FIG. 1 is a side elevational view of "robot" type spot welding machine embodying the present invention.

Referring more particularly to FIG. 1 of the drawing, numerals 1 and 2 denote a pair of welding electrodes supported by horns 3 and 4, respectively which are integrally connected to supporting arms 5 and 6 respectively, which are both pivotally mounted on a central pivot shaft 7. Connected to the top of arm 5 is a piston rod 8 which is connected to a piston 9 contained within air cylinder 10. Such cylinder is mounted on a trunnion or pivot on the housing of cylinder 10 and is pivotally supported by an upper integral extension 6b of horn 6.

In operation, when air under pressure is introduced in cylinder 10 between pistons 9 and 15, piston 9 will move to the left, as viewed in FIG. 1, and will cause horns 3 and 4 and electrodes 1 and 2 to move towards the work W. As the electrodes 1 and 2 contact the work W, spot welding occurs from current flowing through the high current capacity secondary shunts of a stationarily mounted transformer (not shown).

After welding, when air is introduced into the left side of piston 9, both horns 5 and 6 will move about pivot shaft 7 as a center, in an opposite direction than that already described, thereby retracting electrodes 1 and 2 from work W until piston 9 comes against the adjustable piston stop 15.

Such piston is adjusted by turning the adjusting handle 16.

Piston 15 is held in position by air pressure on the rod side. When it is necessary to clear an obstacle, such air pressure is exhausted allowing piston 9 to move piston 15 to the right until it hits bottom.

The amount of retraction assigned to the upper electrode is controlled by adjusting jackscrew 21 in or out as desired.

When the retraction stroke is used, jackscrew 21 will contact fixed stop 22 which will limit the stroke of the upper electrode. The remainder of the total stroke goes to the lower electrode. For example, if the total stroke is 5″ and stop 22 is adjusted so that the upper electrode strokes 2″, then the lower electrode will stroke 3″.

Instead of having equal working and retracting movements of electrodes 1 and 2, they may be varied so that one electrode may have a greater working, as well as a greater retracting movement than the other.

An adjustable link type stop 17 is selectively driven back and forth, through cushioning springs, by a D.C. stepping motor 20 and screw rotated thereby. This will provide a means of adjusting and programming the elevation of the electrodes 1 and 2 in the Z direction, in order to weld on different planes, such as a contour or a panel with steps. If stop 17 is driven to the left, both upper and lower electrodes 1 and 2 will move up the same amount. This feature has nothing to do with the weld stroke or retraction stroke.

The elevation (height from the floor) of electrodes 1 and 2 is preprogrammed. This is accomplished by allowing the entire assembly, comprising parts 1,2,3,4,5,6,6b and 10 to rest, as a unit, against adjustable stop 17. Stop 17, in turn, can be driven to the left or right by D.C. stepping motor 20. If the stop is moved to the left, it will cause the entire assembly to rotate about pivot shaft 7 in a clockwise direction. This rotation will move electrodes 1 and 2 upwardly. Moving stop 17 to the right will have the opposite effect. This travel may be limited to plus or minus 2 inches or a total of 4 inches on a particular machine. In short, the above described adjustment is vertically, in the Z direction for the work W. Of course, if manual instead of automatic adjustment is desired, rod 18 may be adjustably moved horizontally such as by a carriage.

To adjust the electrodes 1 and 2 horizontally, carriage 22 is driven in the X direction, to the right or left, by the X drive motor. To adjust horizontally at right angles thereto, in the Y direction, a lower carriage 24,25 is selectively driven on tracks 26 in either direction.

Thus the electrodes 1 and 2 are selectively adjustable in the X,Y and Z directions, at right angles to each other.

If a five inch stroke is available, it can be divided, as described, between the working stroke and the retraction stroke,—say two inches of working stroke and three inches of retraction stroke. Such larger retraction strokes are used to clear obstruction when indexing. Then the welding strokes can be divided, as desired, between the upper and lower electrodes,—say one half inch stroke of the upper electrode 1 and one and one half inch stroke for the lower electrode 2. Of course, these figures can be reversed simply be moving programmable stop 17 oppositely to the right.

Since the weight of the welding machine can be supported by two heavy X-Y direction floor (at right angles) mounted slides the size of the welding transformer and welding force system of almost no limit is obtainable as compared to resistance welding "robots" on the market today. They are very limited in the weight they can carry due to their particular suspension system, such as a cantilever system. Typical parameters of the present welder are a weld force of 2000 lbs. at 80 psi air, 24000 amps short circuit, 100 KVA transformer 90″ "travel in the Y axis and 30″ travel in the X axis and 3 inch travel in the Z axis".

The electrode retraction feature can be pre-set so as to be used on the upper electrode 1 only, or on the lower electrode 2 only, or it can be divided between the upper and lower electrodes.

After a weld is made, and the electrodes are retracted, the welding unit, including the transformer, is moved to the next weld location by energizing either the X drive motor or Y drive motor or both. Both motors are preferably closed loop resolver feedback D.C. servomotors which drive the carriages in the X direction and in the Y direction (at right angles thereto) through linear ball screws. Also an addition to direction of movement in the Z direction may be provided by moving stop 17 through closed loop D.C. motor 20.

The spot weld locations, weld schedules and sequencing may be accomplished by means of a programmable controller. Thus it is possible to weld a door which is either flat or curved and to sequentially spot weld numerous parts thereto of different sizes by properly choosing, during programming, the proper weld strokes and retraction strokes of each of the respective electrodes 1 and 2. The welding machine can weld, index and weld over 500 preprogrammed spots on a panel. The spot welding schedules of squeeze time, weld time, current and welding force can be pre-programmed from a choice of 20 schedules or so.

By virtue of such programming by teach pendent or tape, a wide variety of weld programs can be accomplished to spot weld a complete piece of work in a fraction of the time it normally takes to weld.

Moreover, unusual shaped items, such as a curved door panel may be spot welded very speedily to many appurentenances, such as hinges, brackets, angles, channels, latches and the like. It is useful to weld train doors, bus doors, vending machine doors and panels, copy machine panels, electrical control panels etc.

Thus it will be seen that I have provided a "robot" function to a very heavy duty resistance spot welder by virtue of the pivotal assembly described above, including various adjustments for varying working strokes and retracting strokes of the electrodes; furthermore, I have provide an extremely high speed programmed spot welder, not heretofore possible in a large welding machine which enables its performance to out-match that of any existing welders of high capacity and rating, therefore considerably increasing production and thereby greatly reducing the cost for welding various items; also since the weight of the present welder is supported by two heavy X-Y floor mounted slides, there is almost no limit as to the size of the welding transformer and welding force system.

While I have illustrated and described a single embodiment of my invention, it will be understood that this is by way of illustration only and that various changes and modifications may be contemplated in my invention and within the scope of the following claims.

I claim:

1. A resistance welding machine comprising a pair of confronting welding electrodes for welding a work therebetween, a pair of elongated pivotally mounted horns for supporting large panels therebetween, each supporting one of said electrodes, an air operating cylinder enclosing a pair of pistons, one of said pistons pivotally connected to one of said horns, the other of said pistons having means for adjusting its longitudinal position in said cylinder, said cylinder being connected to the other of said horns, a fixed stop means for adjustably limiting pivotal movement of said one of said horns, stepping motor means for selectively driving, in opposite directions, said other of said horns, and means for selectively adjusting the position of said electrodes in a vertical and horizontal plane comprising motor driven carriages in stacked relationship, whereby adjustment in three planes at right angles to each other is provided, said electrodes and horns being located directly above said carriages.

2. A machine as recited in claim 1 wherein said stepping motor means comprises an arm resiliently mounted on a pivotal stop and a D.C. stepping motor selectively pivoting said arm in either direction.

* * * * *